United States Patent [19]

Watanabe et al.

[11] Patent Number: 5,791,791
[45] Date of Patent: Aug. 11, 1998

[54] CHARACTER INFORMATION PROCESSOR

[75] Inventors: Kenji Watanabe; Takanobu Kameda; Tomoyuki Shimmura. all of Tokyo; Hitoshi Hayama. Suwa; Hiroyasu Kurashina. Suwa; Takeshi Hosokawa. Suwa. all of Japan

[73] Assignees: King Jim Co., Ltd.; Seiko Epson Corporation. both of Japan

[21] Appl. No.: 770,778

[22] Filed: Dec. 20, 1996

[51] Int. Cl.$^6$ ................................................ B41J 19/00
[52] U.S. Cl. .................................. 400/76; 400/9; 395/109
[58] Field of Search ................................ 400/9, 10, 61, 400/76, 615.2; 395/108, 109, 110

[56] References Cited

U.S. PATENT DOCUMENTS

| | | | |
|---|---|---|---|
| 4,907,193 | 3/1990 | Masaki et al. | 400/61 |
| 5,230,572 | 7/1993 | Hirono et al. | 400/9 |
| 5,344,247 | 9/1994 | Sakuragi et al. | 400/76 |
| 5,501,538 | 3/1996 | Sawada et al. | 400/76 |
| 5,562,353 | 10/1996 | Handa et al. | 400/615.2 |
| 5,584,591 | 12/1996 | Mori et al. | 400/615.2 |

Primary Examiner—Edgar S. Burr
Assistant Examiner—Steven S. Kelley
Attorney, Agent, or Firm—Lorusso & Loud

[57] ABSTRACT

A character information processor for carrying out the processing for printing an input character string, includes: a contact-command receiving section for receiving a contact command which commands to print at a character pitch of 0 between the adjacent two characters; and a printing control section for causing to print two characters, which are defined by the contact command, at a character pitch of 0. In addition, a character information processor for printing an input character string on a printed medium so as to exhibit a printing effect on the basis of the stored attribute data of printing effect, includes: a changed-contents available-extent receiving section for allowing a user to select an available extent of the attribute data of printing effect from a plurality of phased extents with respect to the input character string, each of the phased extents having a greater size than an available minimum size; and an attribute-data changing section for allowing to change the attribute data of printing effect in accordance with the changed contents received by the attribute-data changed-contents receiving section.

4 Claims, 13 Drawing Sheets

| | BACKGROUND | FORMAT | STYLE | MODE |
|---|---|---|---|---|
| AVAILABLE EXTENT | MECHANICAL STATE | DOCUMENT UNIT | PARAGRAPH UNIT | CHARACTER UNIT |
| DEFAULT | ○ | ○ | ○ | ○ |
| SAVE | ○ | ○ | ○ | ○ |
| PROVISIONAL (TEMPORARY) | ○ | × | ○ | ○ |
| INDIVIDUAL | × | ○ (DOCUMENT FORMAT DATA) | ○ (PARAGRAPH STYLE DATA) | ○ (LINE-HEAD MODE DATA CHARACTER MODE DATA) |

IN TEXT AREA      RESULTANT OF PLATE MAKING

FIG. 15

| AVAILABLE EXTENT | BACKGROUND<br>MECHANICAL STATE | FORMAT<br>DOCUMENT UNIT | STYLE<br>PARAGRAPH UNIT | MODE<br>CHARACTER UNIT |
|---|---|---|---|---|
| DEFAULT | ○ | ○ | ○ | ○ |
| SAVE | ○ | ○ | ○ | ○ |
| PROVISIONAL (TEMPORARY) | ○ | × | ○ | ○ |
| INDIVIDUAL | × | ○ | ○ | ○ |
| | | (DOCUMENT FORMAT DATA) | (PARAGRAPH STYLE DATA) | (LINE-HEAD MODE DATA CHARACTER MODE DATA) |

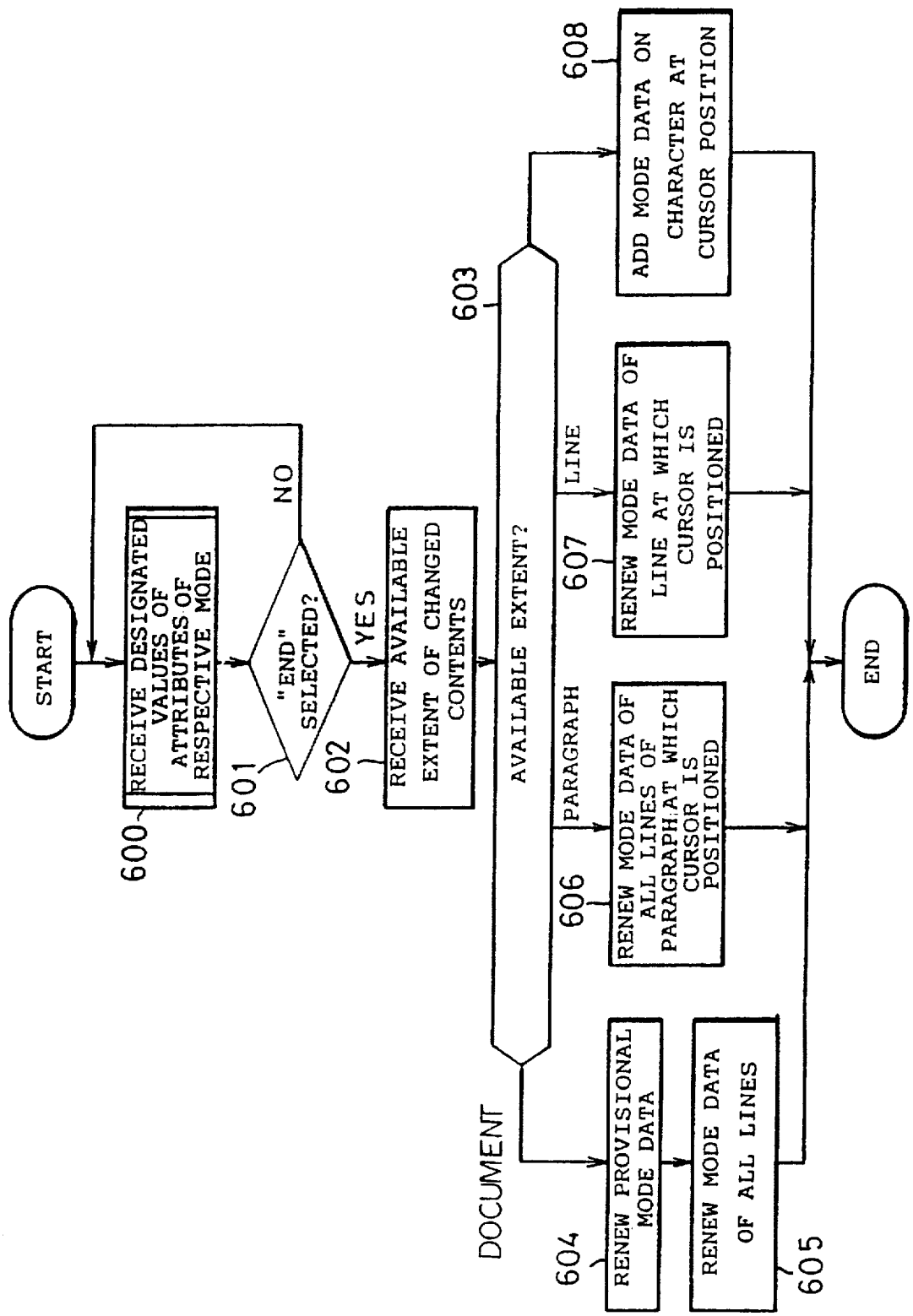

CHARACTER INFORMATION PROCESSOR

BACKGROUND OF THE INVENTION

1. Field of The Invention

The present invention relates to a character information processor. More specifically, the invention relates to a character information processor which can be suitably applied to a tape printing device for printing an input character string on a tape, a seal making device for transferring an input character string on an engraved member to make a seal, and so forth.

2. Description of The Prior Art

In conventional character information processors such as a tape printing device and a seal making device, various functions of improving the user's usability have been proposed.

For example, a seal making device, by which everyone who is not a seal making specialist or expert can easily make a seal, has been proposed in Japanese Patent Laid-Open No. 6-278350.

This publication discloses, in detail, how to form irregularities on an engraved member on the basis of imprint figure information (e.g. information on character strings, arrangement thereof and so forth) received by information processing means. However, this publication only discloses simply how to receive the imprint figure information. That is, this publication only discloses that means for receiving an input character string (which does not only include a keyboard, but also includes constructions for processing the keyboard), which is adopted in a character information processor such as a word processor and a personal computer, and so-called image scanner can be applied thereto.

In addition, in the case of a tape printing device, users tend to require that a label made by the tape printing device has many printing effects. Therefore, functions for complying with such a request for the variety of printing effects have been proposed.

The printing effects herein include the effect on the whole input character string (which will be hereinafter referred to as a "document"), the effect on a partial character-string unit (which will be hereinafter referred to as a "paragraph") obtained by dividing a character string in the longitudinal direction of a tape, and the effect on the respective characters. The attributes of printing effects on a document include, for example, the length of a label, the lengths of margins provided before and after a character string, a ground design applied to the whole label, and so forth (a set of these attributes will be hereinafter referred to as a "format"). In addition, the attributes of printing effects on a paragraph include, for example, the character size on the respective lines, the layout of characters in a paragraph, the table printing, and so forth (a set of these attributes will be hereinafter referred to as a "style"). Moreover, the attributes of printing effects on the respective characters include the ornamental writing, the half-tone dot meshing, and so forth (a set of these attribute will be hereinafter referred to as a "mode").

In conventional tape printing devices, in order to change the contents of the attributes of printing effects which have been initially set by the device, it is required to independently carry out the changing operations for each of the attribute groups ("format", "style", "mode") of objects (document, paragraph and character), to which the printing effects are applied and which have various sizes. That is, in conventional tape printing devices, separate input keys for setting "format", "style" and "mode" are prepared. When a user operates an input key for setting "format" (a format key), choices with respect to the respective attributes of "format" are displayed so as to allow the user to select any one of the choices. When the user operates an input key for setting "style" (a style key), choices with respect to the respective attributes of "style" are displayed so as to allow the user to select any one of the choices. When the user operates an input key for setting "mode" (a mode key), choices with respect to the respective attributes of "mode" are displayed so as to allow the user to select any one of the choices.

As mentioned above, conventional seal making devices and tape printing devices have various functions for improving the user's usability. However, there are the following problems.

First, in the case of the conventional seal making devices, information processing means for receiving information on input character strings and so forth, is adopted in a character information processor such as a word processor and a personal computer. In this information processing means, it is not considered that imprint figure information is reflected on an engraved member. That is, this information processing means has no special function for causing imprint figure information to be reflected on an engraved member.

An imprint figure formed on a seal has various ornaments although the degree of ornament is less than those of designs on a label, and it often includes an optional mark. For example, a logo mark is applied to a company's name seal. In a case where such a mark is made using the external character function, it may be required to divide the mark into two external characters in view of the size thereof and so forth. In this case, when the mark is transferred and printed, the attribute must be set so that these external characters contact with each other. In the case of word processors, personal computers and so forth, although the character pitch can be set only for any one of the whole pages, each page and each line, it can not be set for single characters. Therefore, it is not possible to set a single character pitch downstream of a selected character different from the other character pitches.

Some tape printing devices for printing an input character string on a tape have the function of setting different character pitches for characters in the string. That is, some tape printing devices are designed that the character pitch set for a certain character is effective up to another character on the same line, for which a different character pitch is set. In a case where this function is applied to a seal making device, it is possible to set a character pitch downstream of an external character different from the other character pitches.

However, if two characters (external characters) are connected (or brought into contact with each other) using this function, it is required to carry out two operations for setting the character pitch for each of the characters.

In addition, in the case of an imprint figure on a seal, the respective characters are basically adjusted at regular intervals. Therefore, it is required to change the character pitch for each of characters only when two characters are connected as mentioned above.

In such a situation that is under a little requisition, if the function of setting the character pitch for each of characters is provided, there is a problem in that the program structuring and so forth of the device are complicated to increase the cost of the device.

On the other hand, in the case of tape printing devices, with respect to some of the attributes of printing effects, the unit of size to be applied can be optionally determined by the maker, not absolutely determined. For example, the unit of the extent of input character strings, in which any one of vertical and horizontal writings is set, is not absolutely determined. In practice, although conventional tape printing devices are designed to set any one of vertical and horizontal writings for paragraphs, it is also possible to set the vertical or horizontal writing for each characters.

In the method for setting the vertical or horizontal writing for paragraphs, the user's operativity when changing the setting is better than that in the method for setting it for every characters. However, the same paragraph can not include both of vertical and horizontal writings, so that there is a disadvantage in that it is not possible to make various labels. On the other hand, if the method for setting the vertical or horizontal writing for each character is selected, the same paragraph can include both of vertical and horizontal writings to make various labels. However, in a case where the setting for the whole paragraph or the whole document is changed to the vertical (or horizontal) writing, there is a problem in that the changing operation must be carried out for each character so that the operation is very complicated.

Furthermore, even in a case where it is possible to set the vertical or horizontal writing for paragraphs, the changing operation must be carried out for each paragraph in order to change the whole document to the vertical (or horizontal) writing, so that the operation is complicated.

Similarly, in other character information processors such as a seal making device for transferring an input character string on an engraved member to make a seal, there is the aforementioned operational problems with respect to the setting of the attribute of printing effect.

SUMMARY OF THE INVENTION

It is therefore an object of the present invention to eliminate the aforementioned problems and to provide a character information processor which can change the printing effect by a simple operation.

In order to accomplish the aforementioned and other objects, according to one aspect of the present invention, there is provided a character information processor for carrying out the processing for printing an input character string, the character information processor comprising: contact-command receiving means for receiving a contact command which commands to print at a character pitch of 0 between the adjacent two characters; and printing control means for causing to print two characters, which are defined by the contact command, at a character pitch of 0.

In this character information processor of the present invention, a contact command is provided for commanding to print at a character pitch of 0 between the adjacent two characters so that it is possible to simply direct to connect two characters with each other.

According to another aspect of the present invention, there is provided a character information processor for previously storing attribute data of printing effects, which provide a variety of printed results and which have a predetermined available extent, and for printing an input character string on a printed medium so as to exhibit the printing effects determined by the attribute data of printing effects, in accordance with the attribute data of printing effects when commanding the printing, the character information processor comprising: attribute-data changed contents receiving means for receiving inputted changed contents with respect to the attribute data of printing effects; changed-contents available-extent receiving means for allowing a user to select an available extent of the changed contents which have been received or which are received by the attribute-data changed-contents receiving means, from a plurality of hierarchical extents with respect to the input character string, each of the hierarchical extents having a greater size than an available minimum size of the attribute data of printing effects; and attribute-data changing means for allowing to change the attribute data of printing effects in the whole extent or a partial extent with respect to the input character string received by the changed-contents available-extent receiving means, in accordance with the changed contents received by the attribute-data changed-contents receiving means.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to these specific embodiments, but are for explanation and understanding only.

In the drawings:

FIG. 15 is a view illustrating the data hierarchy structure of the attribute of printing effects and so forth in the second preferred embodiment; and FIG. 16 is a flow chart of the change processing of a mode data in the second preferred embodiment.

DESCRIPTION OF THE PREFERRED EMBODIMENT

Figure 1:
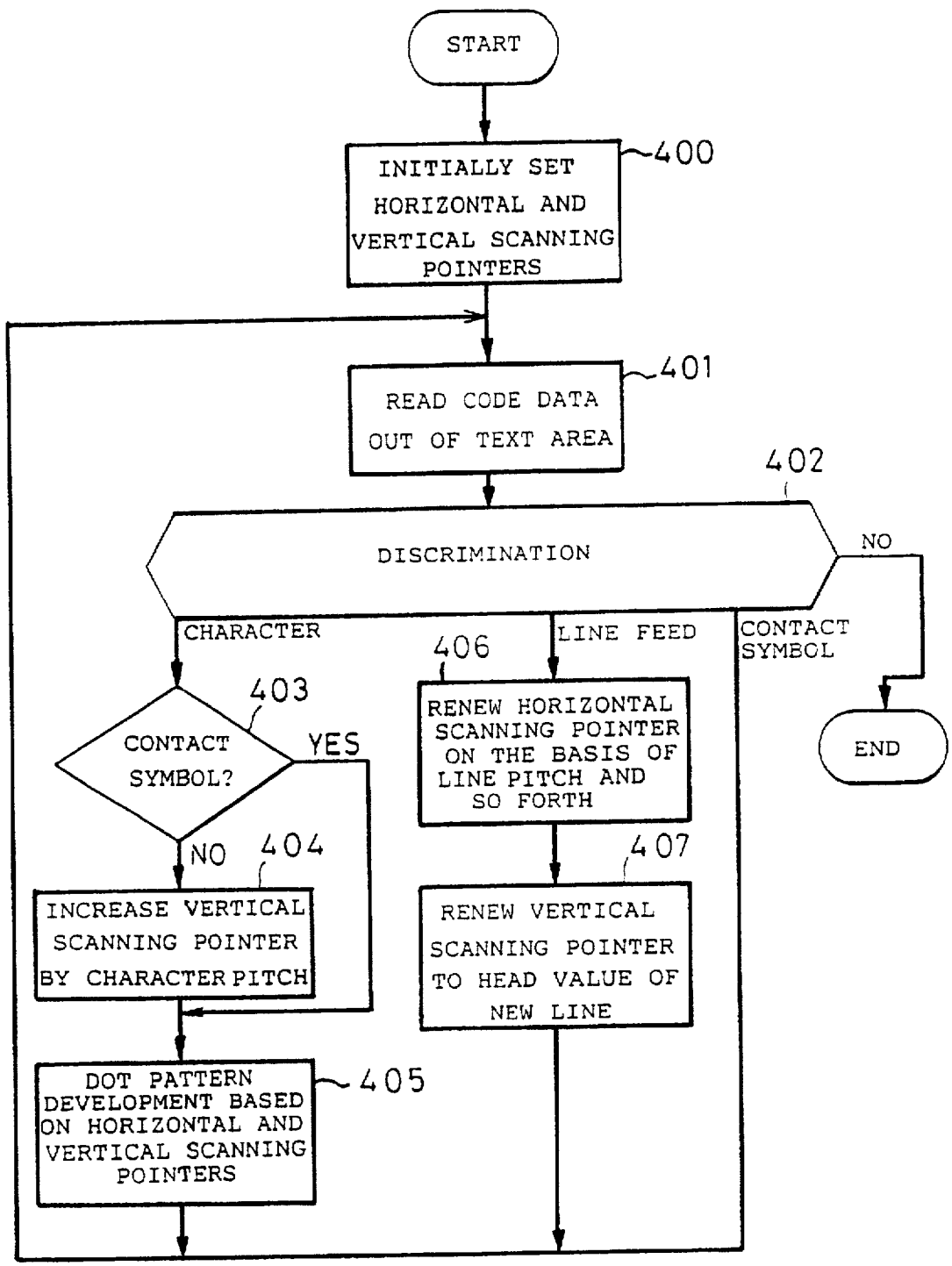
FIG. 1 is a flowchart illustrating a development processing into a printing buffer in the first preferred embodiment of a character information processor according to the present invention.

Referring now to the drawings, the preferred embodiments of a character information processor according to the present invention will be described below.

(A) First Preferred Embodiment

Referring to the drawings, particularly to FIGS. 1 through 12, the first preferred embodiment of a character information processor according to the present invention, which is applied to a seal making device, will be described below.

(A-1) Electrical General Construction of First Preferred Embodiment

Figure 2:
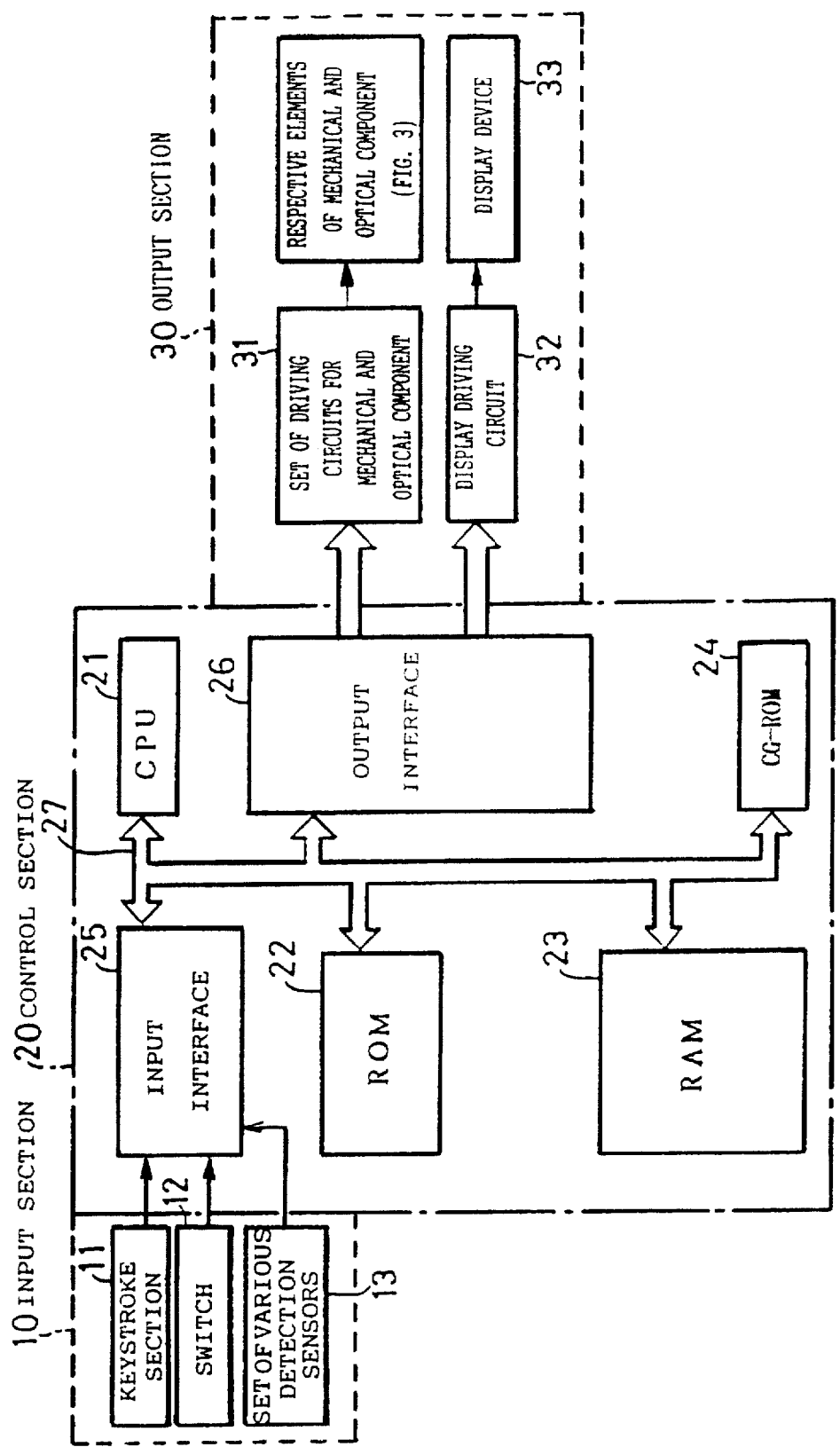
FIG. 2 is a block diagram illustrating an electrical component in the first preferred embodiment.
Figure 3:
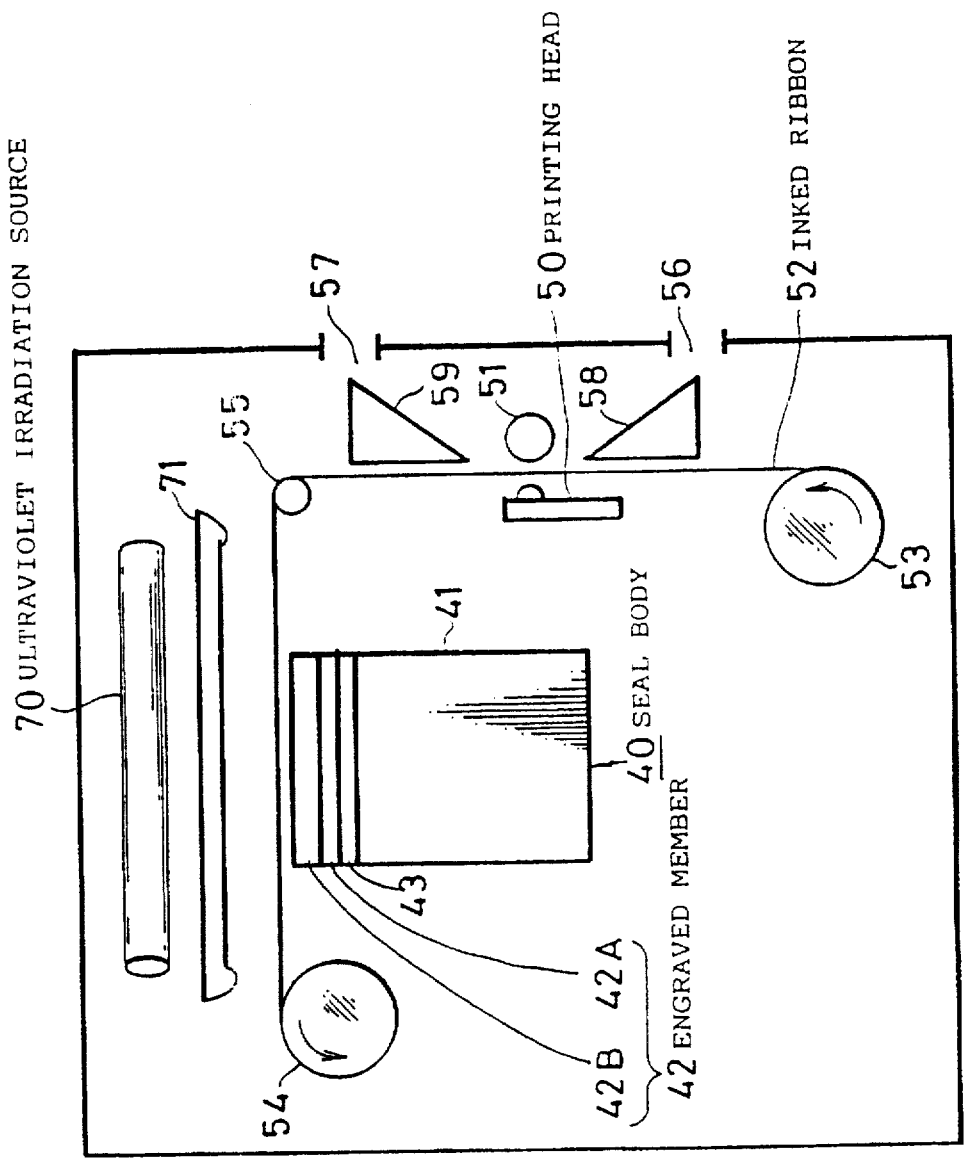
FIG. 3 is a view illustrating the arrangement of a mechanical and optical component in the first preferred embodiment.
Figure 4:
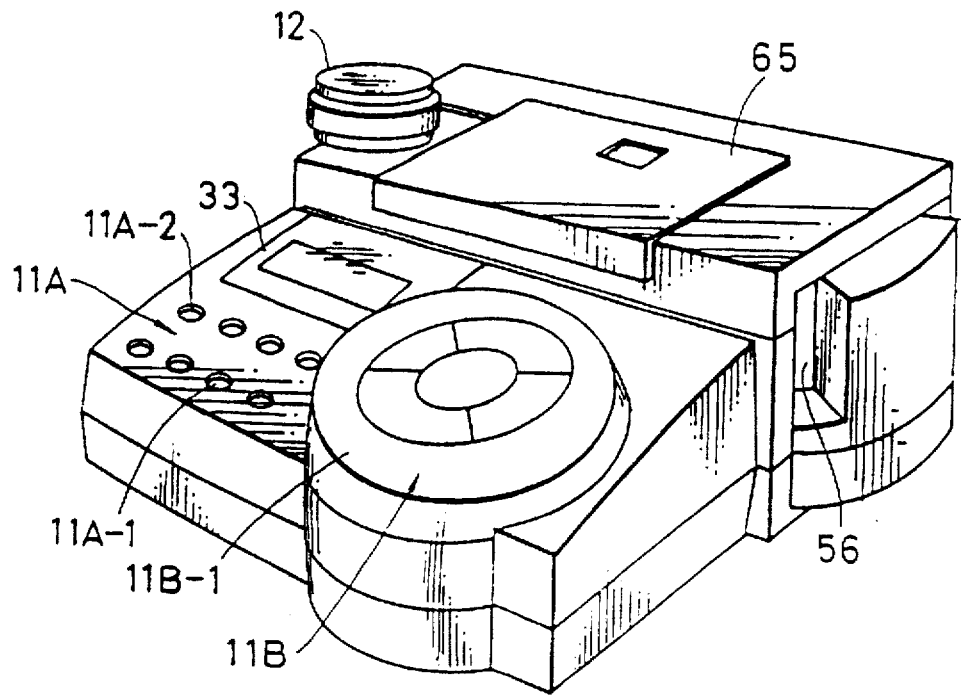
FIG. 4 is a perspective view of a seal making device in the first preferred embodiment.

In this preferred embodiment, a seal making device generally comprises an electrical component (an information processing section, an imprint-figure transfer control section and so forth) as shown in FIG. 2, and a mechanical and optical component (a printing section, a beam irradiating section and so forth) as shown in FIG. 3. FIG. 3 also illustrates the construction of a seal body, and FIG. 4 is a perspective view of the seal making device.

First, referring to the block diagram of FIG. 2 and the perspective view of FIG. 4, the electrical component in this preferred embodiment will be described.

This electrical component is provided generally for receiving imprint figure information to control the mechanical and optical component. The electrical component is a kind of information processor, and generally comprises an input section 10, a control section 20 and an output section 30, similar to other information processors. The control section 20 is designed to carry out the processing on the basis of the information from the input section 10, the processing stage at that point of time and so forth, and to control the mechanical and optical component via the output section 30 on the basis of the processed results.

The input section 10 comprises a keystroke section 11, a switch 12 for switching the state of the device, and a set of various sensors 13.

The keystroke section 11 is designed to produce character code data, various control data and so forth, which are supplied to the control section 20. The keystroke section 11 comprises a character selecting dial section 11B used for the basic input operation of characters, and a functional depression key section 11A for directing to execute various functions. The character selecting dial section 11B comprises a character selecting dial 11B-1 which is rotated to output signals for proposed input characters, and five types of depression keys which are provided on the inner peripheral of the character selecting dial 11B-1 for indicating "selection", "line feed", "no conversion", "conversion", "cursor movement" and so forth. The functional depression key section 11A comprises, for example, eight depression keys which include a symbol key 11A-1 for causing the starting of the input processing of a symbolic character which can not be indicated by the character selecting dial 11B-1, and a plate making key 11A-2 for causing the starting of the plate-making processing.

The switch 12 comprises, for example, a dial switch which directs to turn a power supply on or off, to start the exposure onto the seal body (the engraved member), and to open a lid 65 for covering a space which houses the seal body therein. As detection sensors, there are provided a sensor for detecting the type of a seal, a sensor for detecting the mounting of an inked ribbon, and a sensor for the mounting and position of a plate-making sheet, which will be described later.

The output section 30 comprises a set of mechanical and optical component driving circuits 31 for driving and controlling the respective sections of the mechanical and optical component which will be described later, and a driving circuit 32 for a display device 33. The respective driving circuits 31, 32 drive the corresponding components while being controlled by the control section 20.

Figure 5:
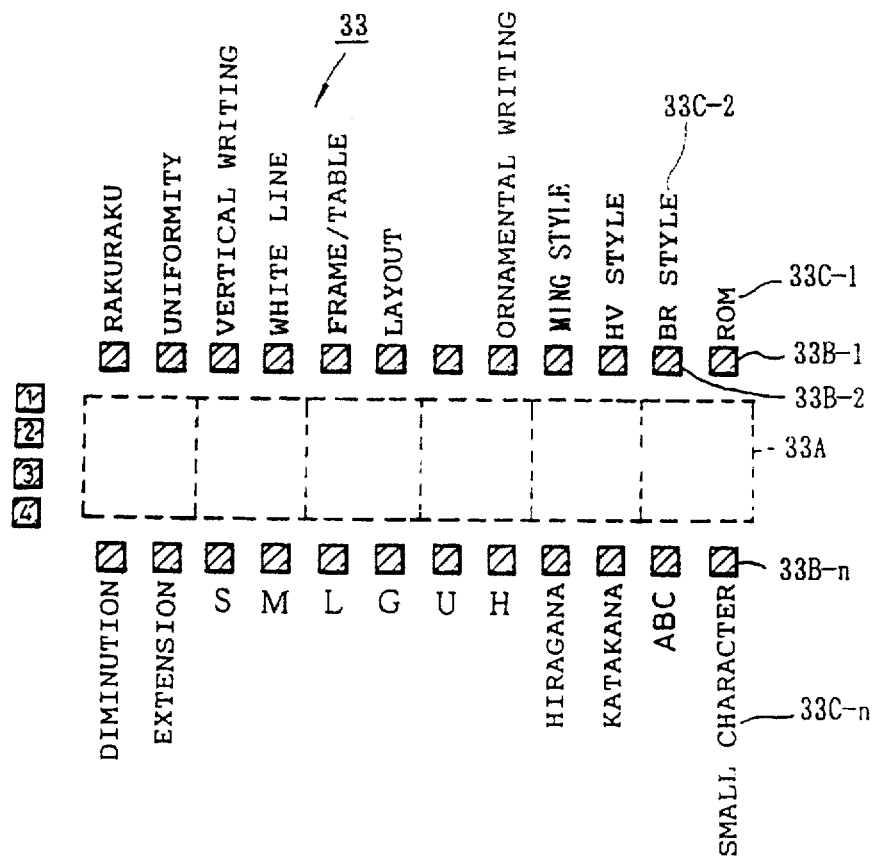
FIG. 5 is a plan view of a display device in the first preferred embodiment.

As shown in FIG. 5, the display device 33 comprises a liquid crystal display 33A which is, for example, capable of displaying six characters, and a plurality of indicators 33B-1 through 33B-n, which are arranged around the liquid display 33A and each of which comprises a LED. On the liquid crystal display 33A, there are displayed a guidance message for the user, and a character string (imprint figure information) inputted by the user. On the surfaces of the device relating to the respective indicators 33B-1 through 33B-n, there are printed characters 33C-1 through 33C-n, each being indicative of the attribute and state assigned to the corresponding indicator, so as to indicate the contents of the present attribute and state by the lighting, non-lighting and flashing of the corresponding one of the indicators 33B-1 through 33B-n.

Furthermore, although the set of the mechanical and optical component driving circuits 31 comprise various driving circuits, these circuits are herein illustrated by the labeled block 31. As will be described later, the mechanical and optical component includes various elements which must be controlled for drive, and in practice, each of the elements has a driving circuit.

The control section 20 is, for example, a microcomputer, and comprises a CPU 21, a ROM 22, a RAM 23, a character generator ROM (CG-ROM) 24, an input interface 25 and an output interface 26 which are connected to each other via a system bus 27.

The ROM 22 stores therein various processing programs executed by the CPU 21 for making a seal (see FIGS. 1, 8, 10 and 11), and fixed data such as dictionary data for kana-kanji conversion.

The RAM 23 is used as a working memory by means of the CPU 21, and stores therein fixed data relating to the user's input. The RAM 23 is backed up when the power supply is turned off.

The CG-ROM 24 stores therein the dot patterns of characters and symbols which are prepared in the seal making device, and outputs a corresponding dot pattern when a code data for defining a character or symbol is supplied.

The input interface 25 provides the interface between the input section 10 and the control section 20, and the output interface 26 provides the interface between the output section 30 and the control section 20.

The CPU 21 executes the processing program in the ROM 22, which program is determined by the input signal from the input section 10 and by the processing stage at that point of time, while utilizing the RAM 23 as a working area, and properly using the fixed data stored in the ROM 22 and the RAM 23 if necessary. The CPU 21 causes the display device 33 to display the processed state, the processed results and so forth, and causes the respective sections of the mechanical and optical component (FIG. 3) to make a seal.

Then, referring to FIG. 3, the constructions of the mechanical and optical component and the seal body will be described.

The seal body 40 comprises a rod-like stock 41 (which may also be made of materials other than wood), a sponge member 43 mounted on one end portion of the stock 41 for absorbing the pressing force and pressing reaction to improve the familiarity of the projections of the engraved member with a paper surface when stamped, and a plate-like engraved member 42 provided on the surface of the sponge member 43. The engraved member 42 comprises a base layer 42A which does not react with ultraviolet rays, and an ultraviolet curable resin layer 42B which is exposed to the outside. The thickness of the ultraviolet curable resin layer 42B is selected on the basis of the projecting amount requested for the projection, to which a stamp pad on the face of a seal is adhered. In the ultraviolet curable resin layer 42B, the portions other than the cured portion can be removed by a given liquid (e.g. water, but it may also be a gas).

A plurality of non-through openings (not shown) are provided in the stock 41 of the seal body 40 on one side thereof. A plurality of projections provided on the device body are designed to be fitted into these non-through openings for mounting the seal body 40 on the device. In addition, a physical identification element such as a hole for defining the type of seal is provided in an end surface on which the engraved member 42 of the stock 41 of the seal body 40 is not mounted. This physical identification element is read by a detection sensor (one of the sensors 13) for detecting the type of seal.

The mechanical and optical component as shown in FIG. 3 generally comprises a printing component and an ultraviolet irradiating component.

The printing component is a thermal transfer system, and comprises a fixed type printing head 50, a platen roller 51, an inked ribbon 52, a supply reel 53, a take-up reel 54, and a roller 55 for turning the inked ribbon 52. The printing component further comprises an insert hole 56 for receiving a plate making sheet (see FIG. 6), a discharge hole 57 for discharging the plate making sheet, a guide member 58 for guiding the plate making sheet, which has been inserted from the insert hole 56, to a printed position (the guiding member including a detection sensor for detecting the mounting and position of the plate making sheet), and a separating mechanism 59 for separating the plate making sheet from the inked ribbon 52, which has traveled from the printed position, to guide the separated plate making sheet to the discharge hole 57.

Figure 6A:
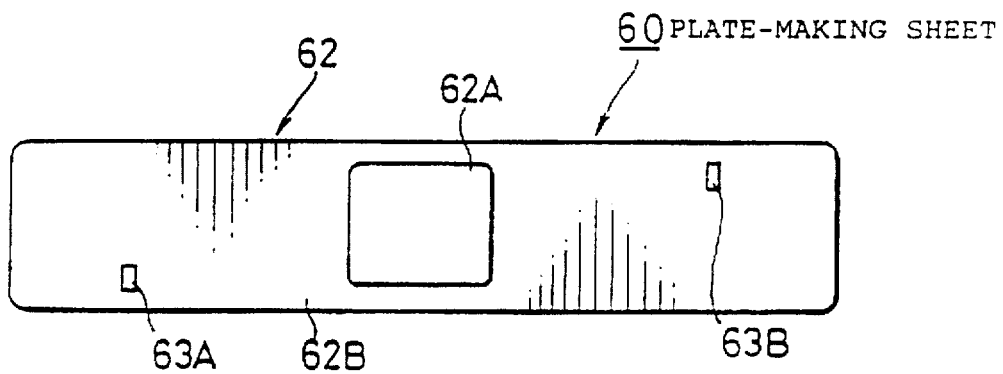
FIGS. 6A and 6B are views illustrating a plate-making sheet in the first preferred embodiment.
Figure 6B:
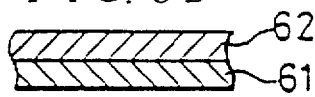

FIG. 6 illustrates a plate making sheet 60 for a rectangular seal. The plate making sheet 60 comprises a sheet body 62, to the back of which an adhesive is applied, and a released paper, 61 provided on the back of the sheet body 62. The plate making sheet 60 has the same size regardless of the type of seal, and has a pair of through openings 63A, 63B for determining the printing starting position. However, the sheet body 62 is divided into a portion 62A of the same shape as the external form of the engraved member 42 which is different if the type of seal is different, and another portion 62B, by half cut so that only the portion 62A can be peeled off.

When such a plate making sheet 60 is inserted from the insert hole 56, the end portion of the plate making sheet 60 is piled up on the inked ribbon 52 to be positioned at the printing position between the printing head 50 and the platen roller 51.

When a heat generating circuit (see reference number 31 in FIG. 2) is driven while being controlled by the control section 20, the printing head 50 generates heat to transfer the ink of the inked ribbon on the plate making sheet 60.

On the thermal transfer type inked ribbon 52, the ink is removed from the transferred portion, so that the transferred portion becomes transparent. That is, after the transfer, the inked ribbon 52 comprises a portion for allowing the penetration of ultraviolet rays (the portion from which the ink is removed), and another portion for preventing the penetration of ultraviolet rays (the portion on which the ink remains). Therefore, this preferred embodiment utilizes, as a negative film, the transferred inked ribbon 52, on which the printing processing of an imprint figure has been carried out and in which the portion corresponding to the imprint figure has been transparent. Thus, since a sheet to be printed is used for preparing a negative film, such a sheet is referred to as the "plate making sheet" and the printing is referred to as the "plate making" in the specification as mentioned above.

When the plate making is carried out, the inked ribbon 52 and the plate making sheet 60 piled thereupon, which have passed through the printing portion comprising the printing head 50 and the platen roller 51, reach the separating mechanism 59 by means of the platen roller 51 or a driving roller (not shown), so that the inked ribbon 52 and the plate making sheet 60 are separated from each other by means of the separating mechanism 59.

The separated plate making sheet 60 is fed to the discharge hole 57. On the other hand, the separated inked ribbon 52 is designed to stop at the position facing the ultraviolet curable resin layer 42B of the seal body 40. Such an inked ribbon 52 traveling when the plate making is carried out is designed to be wound onto the take-up reel 54.

If the printed portion 62A is removed from the plate making sheet 60, which has been discharged from the discharge hole 57, to be attached to the top portion of the seal body 40, it is possible to visually recognize the face of the seal body 40.

As an ultraviolet irradiating structure, for example, an ultraviolet irradiation source (having, e.g. a parabolic mirror) 70 comprising a fluorescent lamp is fixedly provided. The turning ON and OFF of the ultraviolet irradiation source 70 are controlled by means of the control section 20. In addition, a transparent plate 71, which is moved in forward and rearward directions by means of a forward and rearward moving mechanism (not shown), is provided so as to face the ultraviolet curable resin layer 42B of the engraved member 42 via the inked ribbon 52. That is, the ultraviolet rays irradiated from the ultraviolet irradiation source 70 are designed to reach the ultraviolet curable resin layer 42B via the transparent plate 71 and the inked ribbon (the negative film) 52. The transparent plate 71 is designed to bring the inked ribbon 52 serving as the negative film, into suitably contact with the ultraviolet curable resin layer 42B at a forward position (a position when the switch 12 directs to start the exposure), and it is not designed to block the traveling of the inked ribbon 52 at a rearward position.

Both ends of the transparent plate 71 in the traveling direction of the inked ribbon 52 are, for example, rounded so as not to damage the inked ribbon 52 when the transparent plate. 71 contacts the inked ribbon 52. In addition, the rounded both ends of the transparent plate 71 slightly project from the major surface thereof, to serve to enhance the tension of the inked ribbon 52 to bring the inked ribbon into tightly contact with the engraved member 42 when the transparent plate 71 moves forwards.

In addition, since a great pressing force is applied to the inked ribbon 52 although it depends upon the mounting structure of the seal body 40, the inked ribbon 52 is preferably formed of a sheet member which has a higher resistant material to the vertical pressing force than that of a usual inked ribbon.

(A-2) Seal Making Processing

Figure 7:
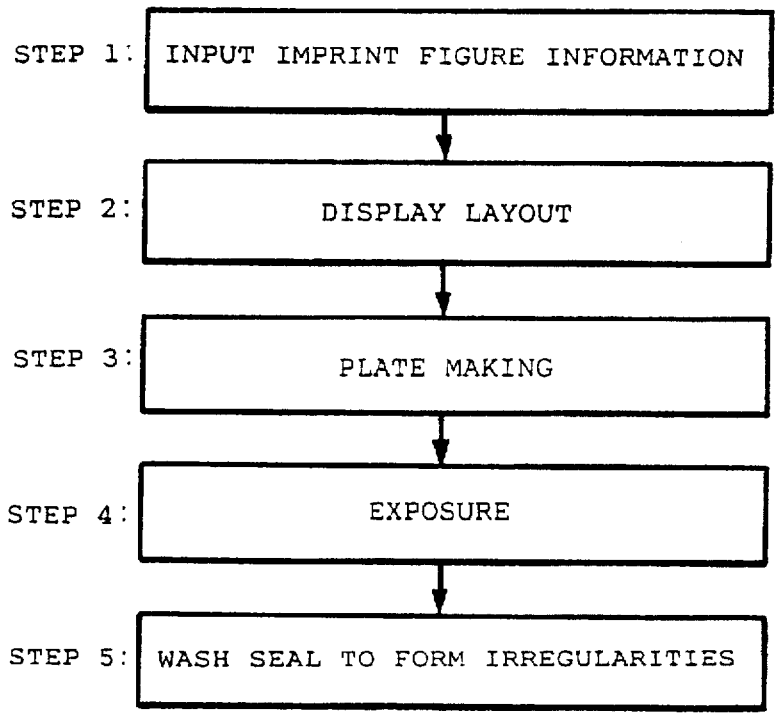
FIG. 7 is a view explaining the seal making steps in the first preferred embodiment.

Referring to FIG. 7, the usual steps of procedures carried out by the user for making a seal using the seal making device in this preferred embodiment, will be described below.

Step 1

The user operates the switch 12 to turn the power supply on, and then, the user operates the various depression keys and the dial key of the keystroke section 11 to input imprint figure information. The input of the imprint figure information does not only include the input of a character string which forms an imprint figure, it but also includes the input of various attributes such as the character's font, the vertical or horizontal writing, and the character size (even if the attributes are not inputted, the attribute value of default has been determined). Furthermore, in this preferred embodiment, the seal making device is designed to allow the input of imprint figure information only when the seal body 40 is mounted on the device. In addition, the seal making device is designed to vary the number of lines which can be inputted, and the available maximum number of characters on the respective lines in accordance with the type of the seal body 40 mounted on the device.

Step 2

When the input of the imprint figure information is completed, the user generally operates a layout displaying key of the keystroke section 11 to carry out the layout display to confirm whether the imprint figure is a desired figure. When the layout displaying key is operated, the CPU 21 of the seal making device causes the layout display of the imprint figure by developing the input character string on a display buffer of the RAM 23 in accordance with the various attributes relating to the input character string.

Step 3

The user, who has confirmed the appropriateness of the imprint figure by the layout display, inserts the plate making sheet 60 into the insert hole 56 so that the plate making sheet 60 comes to the end. Thereafter, the user operates the plate making key of the keystroke section 11 to carry out the plate making processing to make a negative film on the inked ribbon 52. When the plate making key is operated, the CPU 21 of the seal making device causes the development of the input character string into a printing buffer of the RAM 23 in accordance with the various attributes relating to the input character string. Thereafter, the CPU 21 drives the printing head 50 and the platen roller 51 to cause to print to make a negative film, and causes to carry the negative film to the position facing the engraved member 42.

Step 4

When the plate making processing is completed, the user operates the switch 12 to direct to carry out the exposure. At this time, the CPU 21 of the seal making device causes the liquid crystal display 33A to display a confirmation message as to whether the exposure should be carried out. In response thereto, when the user operates the execution key of the keystroke section 11, the CPU 21 causes the ultraviolet irradiation source 70 to irradiate ultraviolet rays onto the engraved member 42. In this case, the CPU 21 causes the irradiation until an irradiation period of time determined in accordance with the type of the mounted seal body 40 elapses. During the irradiation, the residual period of time is displayed by a bar graph display or the like. When a predetermined irradiation period of time elapses, an exposure completed massage is displayed, and the irradiation of ultraviolet rays from the ultraviolet irradiation source 70 is stopped. By such an exposure processing, only a portion of the ultraviolet curable resin layer 42B on the engraved member 42 corresponding to the imprint figure is cured.

Step 5

When the exposure is completed, the user operates the switch 12 to direct to open the lid 65, and when the lid 65 is open, the user takes out the seal body 40 on which the exposure is completed. Thereafter, the engraved member 42 of the seal body 40 is immersed in a given liquid (e.g. water) in a vessel which preferably houses a brush therein, and the vessel is reciprocated to wash the engraved member 42 to remove non-cured portions to form irregularities on the engraved member 42. Thereafter, the liquid is wiped up by means of a cloth or the like to complete a seal.

The present invention is characterized by the processing for forming an imprint figure, in which a plurality of characters are brought into contact with each other, on an engraved member. Such processing is classified into the processing steps for receiving a command for contacting a plurality of characters with each other, and the processing steps for printing an imprint figure, in which the plurality of characters are brought into contact with each other (the plate making processing). These processing steps will be described below.

Figure 8:
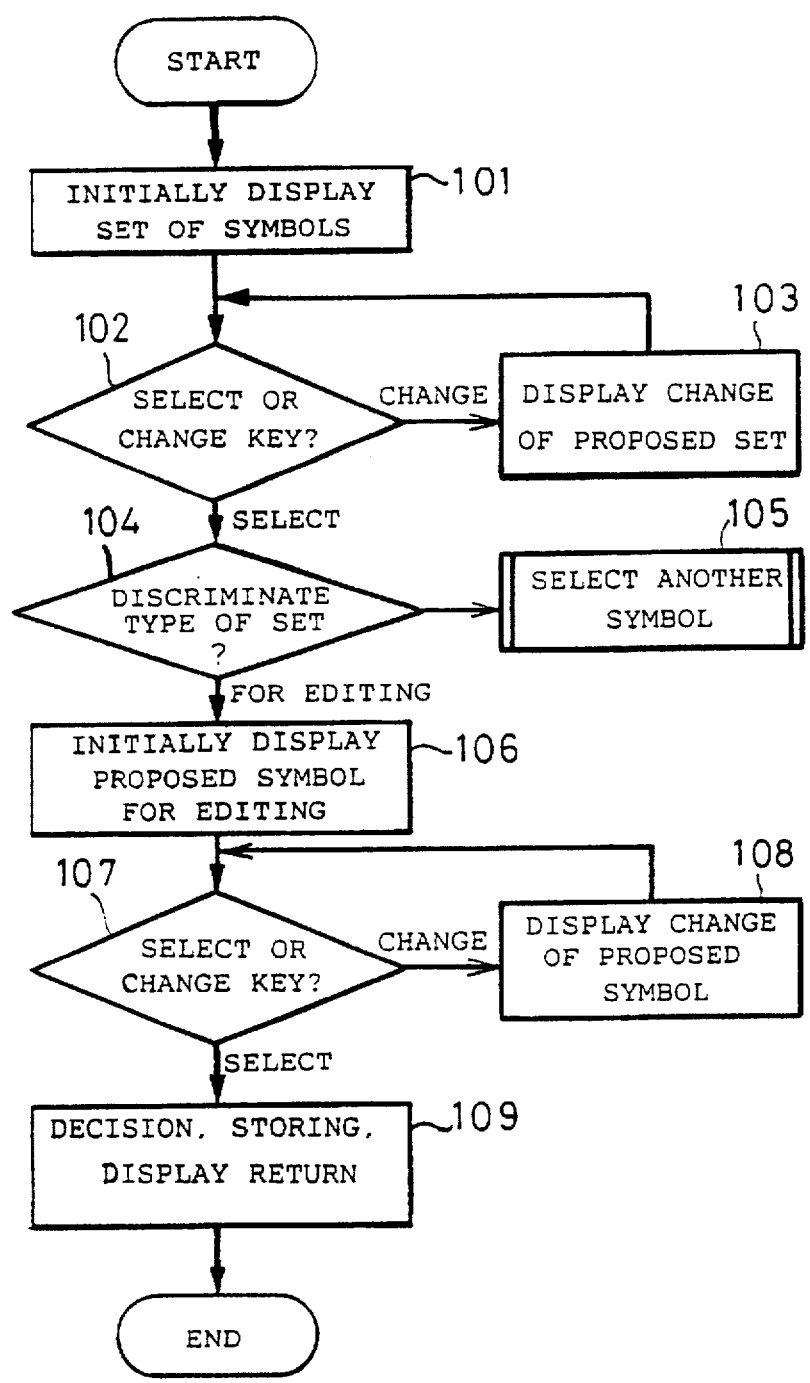
FIG. 8 is a flowchart of processing steps for receiving a contact symbol in the first preferred embodiment.

FIG. 8 is a flowchart illustrating the processing steps for receiving a contact command for two characters and so forth. In this preferred embodiment, the contact command is prepared as a symbol (data). That is, the contact is not commanded by the attribute setting processing with respect to characters, but it is commanded by inputting a symbol for commanding the contact (which will be hereinafter referred to as a "contact symbol").

When the symbol key 11A-1 for directing to start the aforementioned symbol input is operated, the CPU 21 starts to execute the processing program stored in the ROM 22 shown in FIG. 8.

First, at step 101, the CPU 21 causes the liquid crystal display 33A to display an initially proposed set of symbols. For example, as the sets of symbols, there are prepared various sets of symbols, such as unit symbols of physical quantity, describing symbols, living-thing symbols, numerical-formula symbols and editing symbols. In this preferred embodiment, the contact symbol is prepared as one of the editing symbols. As the initially proposed set of symbols, a set of symbols, which have the most frequency in use, are displayed, or another set of symbols, which were selected immediately before, are displayed by the learning function. Furthermore, in the case of a device which displays a plurality of sets of symbols at the same time, for example, the cursor is moved to the present proposed set of symbols which is displayed so as to be flashed on and off.

Thereafter, at step 102, the CPU 21 discriminates whether a select key or a change key (for example, corresponding to a cursor moving key) has been operated. When the change key is operated, the present proposed set of symbols are changed at step 103, and the routine returns to step 102.

In a case where a set of symbols are the present proposed set of symbols, when the select key is operated, the routine goes from step 102 to step 104, so that the CPU 21 discriminates the selected set of symbols. When a set of symbols other than the set of editing symbols are selected, the processing routine goes to step 105, and the CPU 21 performs the processing for selecting a symbol from the selected set of symbols.

On the other hand, when the selected set of symbols are the set of editing symbols, the routine goes to step 106 wherein the CPU 21 causes the liquid crystal display 33A to display an editing symbol as an initially proposed symbol. As step 107, it is discriminated by the CPU 21 whether the select key or the change key (e.g. corresponding to the cursor moving key) has been operated. When the change key has been operated, the routine goes to step 108 wherein the present proposed editing symbol is changed, and returns to the aforementioned step 107.

In a case where an editing symbol is the present proposed editing symbol, when the select key is operated, the routine goes from step 107 to step 109, and it is decided by the CPU 21 that the present proposed editing symbol is selected. In addition, the CPU 21 causes to store the code of the selected editing symbol at a location next to the prior final character code in a text area for input character strings in the RAM 23.

Moreover, the CPU 21 operates the display buffer in the RAM 23 to cause the displayed screen to return to the character input screen displayed at the stage that the symbol key is operated, and to display a dot pattern which defines the editing symbol at the character input location directed by the cursor when the symbol key is depressed, so that a series of processing steps are completed.

Figure 9:
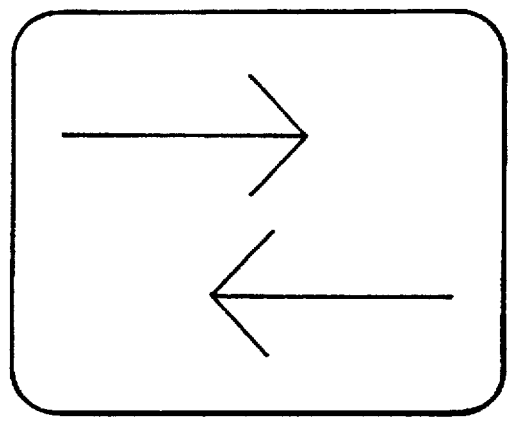
FIG. 9 is a view illustrating a contact symbol for display in the first preferred embodiment.

Therefore, the user may operate the symbol key 11A-1, and then, operate the change key to cause to display the set of editing symbols as a set of symbols. Thereafter, the user may operate the select key, and then, operate the change key to cause to the contact symbol of the set of editing symbols, and thereafter, operate the select key. Thus, the contact code is stored at a location next to the prior final character code in the text area for input character strings in the RAM 23, and the contact symbol shown in FIG. 9 is also displayed on the returned character input screen at a character input location which has been directed by the cursor.

Figure 10:
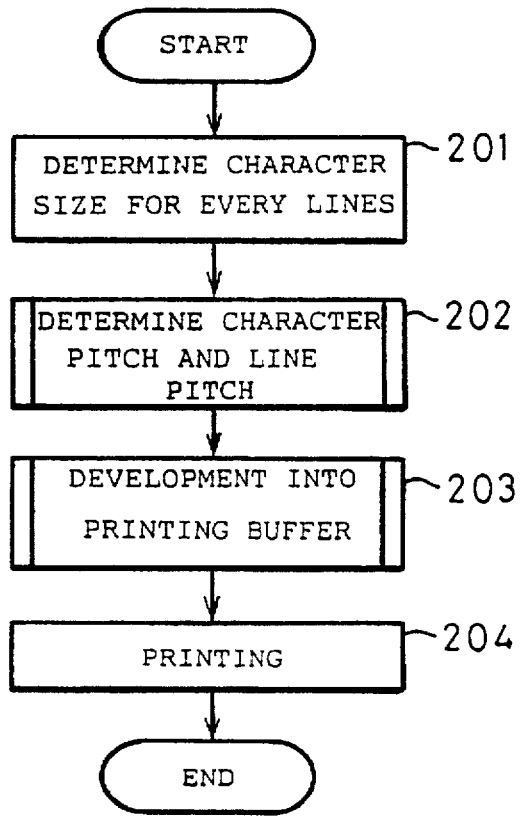
FIG. 10 is a flowchart of plate-making processing in the first preferred embodiment.

Referring to the flowcharts of FIGS. 10, 11 and 1, the processing (the plate-making processing) for causing to print an imprint figure in which a plurality of characters are brought into contact with each other, will be described below.

When the plate-making key 11A-2 for directing to start the plate-making processing is operated, it is confirmed by the CPU 21 that the seal body 40 is mounted and the plate-making sheet 60 is inserted from the insert hole 56. Thereafter, the CPU 21 causes to display a confirmation massage which indicates whether the plate making should be carried out. In response thereto, when the user operates a key for directing to select, the CPU 21 executes the processing program shown in FIG. 10 and stored in the ROM 22.

First, the CPU 21 determines the character size in the respective lines in accordance with the designated contents of the attribute of character size (step 201). Then, in accordance with the method for arranging the designated character, the decided character size, the decided number of lines and so forth, the CPU 21 determines the character pitches in the respective lines, the line pitches, and the reference position when developed into the printing buffer (step 202). Then, on the basis of the decided character sizes in the respective lines, the character pitches in the respective lines, the line pitches and the reference position, and on the basis of the set contents of the attributes such as the vertical writing, the horizontal writing and the framing, the CPU 21 causes the development of the dot pattern of a character string stored in the text area of the RAM 23, into the printing buffer prepared in the RAM 23 (step 203). Finally, the CPU 21 causes the printing head 50, the platen roller 51 and so forth to carry out the printing on the plate-making sheet 60 to make a negative film, and causes to carry the negative film to a position facing the engraved member 42.

Figure 11:
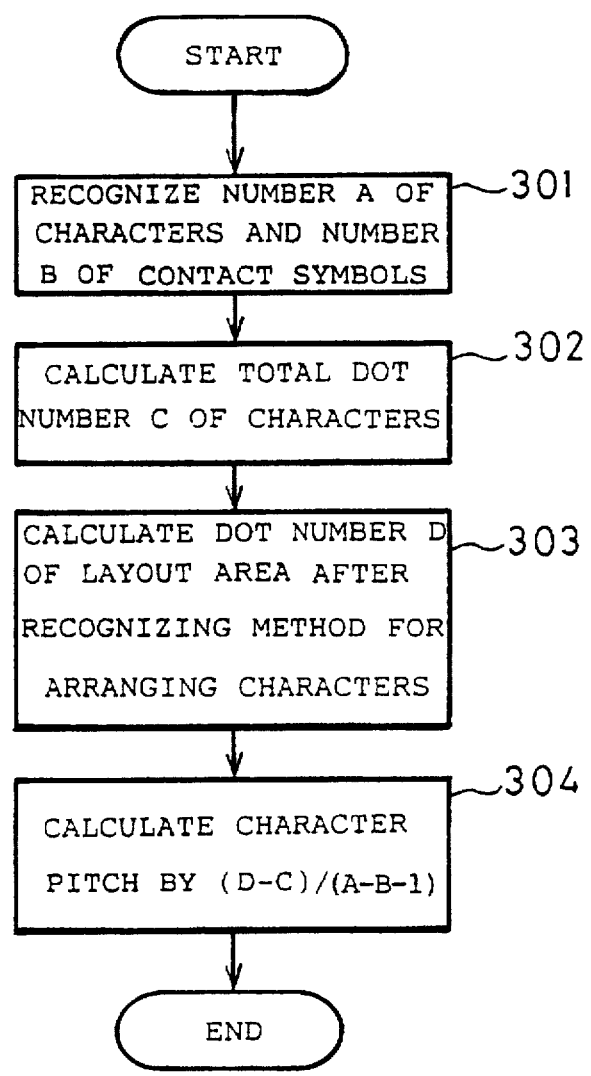
FIG. 11 is a flowchart of processing for determining a character pitch for every lines in the first preferred embodiment.

FIG. 11 is a flowchart showing the detailed processing steps for determining a character pitch in a certain line, with respect to the processing step 202.

When a certain line is an object, the CPU 21 recognizes the number A of characters in the line (including symbols which can be regarded as the same as characters, except for the contact symbols) and the number B of contact symbols, on the basis of the contents stored in the text area of the RAM 23 (step 301).

Thereafter, on the basis of the determined character size, the CPU 21 calculates the total number C of dots required for all the characters in the vertical scanning direction when printed (step 302).

Then, the CPU 21 recognizes the method for arranging characters, and then, it calculates the number D of dots (the number of layout dots) in the vertical scanning direction in an area in which the characters in the line are adjusted (step 303). As the method for arranging characters, there are the front justification for justifying the heads of the respective lines, the centering justification for centering the respective lines, and the layout for justifying the positions of characters on the right and left ends of the respective lines. In the cases of the front justification and the center justification, the number D of layout dots is mainly determined by the number of characters in the line. In the case of the layout, the number D of layout dots is mainly determined by the number of characters in the longest line (not limited to the object line).

Then, the CPU 21 determines the character pitch by $(D-C)/(A-B-1)$(step 304). That is, the character pitch is determined by dividing the total number D-C of dots used between the adjacent characters, by the number A-B-1 of characters obtained by subtracting the number of contact symbols B and 1 from the number of characters A.

FIG. 1 is a flowchart showing the details of an example of the aforementioned development processing step 203 into the printing buffer.

When the development processing is started, the CPU initially sets a horizontal scanning pointer for providing the reference of a developed position in a horizontal scanning direction, and a vertical scanning pointer for providing the reference of a developed position in a vertical scanning direction (step 400). Furthermore, the initially set vertical and horizontal scanning pointers define the developed reference position of the first character in the first line.

Thereafter, the CPU 21 takes one code data out of the text area of the RAM 23 (step 401), and discriminates whether it is a character or a contact symbol and so forth (step 402).

When the code data taken out of the text area is a character data, the CPU 21 discriminates whether the last code data in the text area is a code data of a contact symbol (step 403). When it is NO, the CPU 21 increases the vertical scanning pointer by the character pitch (step 404). When it is YES at step 403 or when the processing step 404 is completed, the CPU 21 reads a dot pattern out of the CG-ROM 24 on the basis of the determined character size and the character code data thereof, and develops the dot pattern of characters defined by the code data, into the printing buffer(step 405) using the horizontal and vertical scanning pointers as references (for example, using the upper-left dot position of the dot pattern as a reference). Then, the routine returns to step 401. Furthermore, the development is carried out in accordance with the attributes such as the vertical writing and the horizontal writing.

When it is discriminated at step 402 that the taken code data is a line-feed code data, the CPU 21 renews the horizontal scanning pointer on the basis of the character sizes and the line pitches in the previous lines, so as to be a reference in the next line (step 406), and renews the vertical scanning pointer to a head value in the new line (step 407). Then, the routine returns to step 401.

When it is discriminated at step 402 that the taken code data is a contact-symbol code data, the CPU 21 causes the routine to immediately return to the aforementioned step 401.

When it is discriminated at step 402 that the code data can not be taken out, the CPU 21 completes the development processing into the printing buffer of the RAM 23.

When the character string includes a contact symbol during such a processing, the dot patterns of the characters before and behind the contact symbol is developed by a character pitch of 0, i.e. developed so as to contact with each other.

Figure 12A:
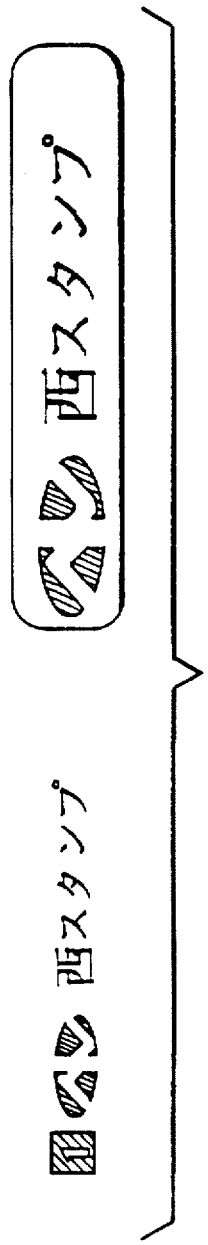
FIGS. 12(A) and 12(B) are views illustrating the printed results when the contact symbol is absent and present, respectively, in accordance with the first preferred embodiment.
Figure 12B:
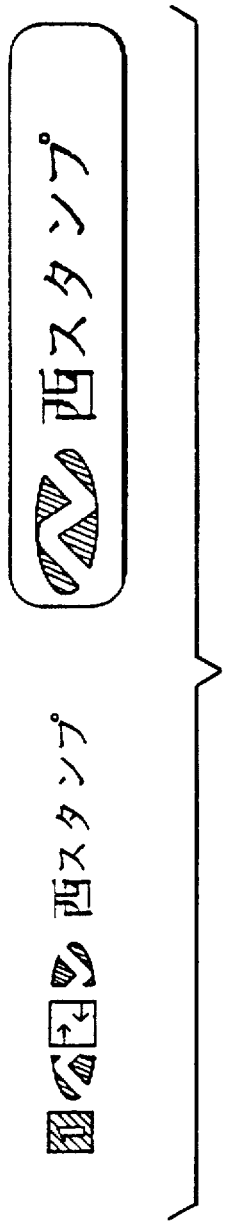

For example, as shown in FIG. 12(B), in a case where the character string information, which includes the first external character indicative of the left half of a logo mark of a company, the contact symbol, the second external character indicative of the right half of the logo mark of the company, and the characters "西", "ス", "テ", "ム" and "ア", is stored in the text area of the RAM 23, the first and second external characters before and behind the contact symbol are brought into contact with each other to be printed on the plate-making sheet 60. Furthermore, for reference, an example of the case that no contact symbol is used is shown in FIG. 12(A).

(A-3) Advantageous Effects of First Preferred Embodiment

According to the aforementioned preferred embodiment, since the contact symbol (the contact command) is provided, it is possible to connect or combine two characters without setting the character pitch, and to simplify the command operation.

In addition, according to the aforementioned preferred embodiment, since the contact command is a contact symbol, it is possible to use the existing processing program for receiving a contact command. In addition, in the processing program for developing the dot pattern into the printing buffer, the number of the processing steps increased by providing the contact command can be insignificant.

(A-4) Modifications of First Preferred Embodiment

In the aforementioned preferred embodiment, while the contact command has been inputted by the symbol selection, it may be inputted in the same manner as that of the usual character input. For example, the contact command may be assigned to one unit angle of the character selecting dial 11B-1. Furthermore, the contact command reflects on the printed results. Therefore, considering that the input is received only when the user surely intends to receive the input, a slightly complicated operating method for carrying out the input by the symbol select is preferred as the preferred embodiment, in comparison with the method for carrying out the input by means of the character selecting dial. In addition, an exclusive key for the contact command may be provided to input the contact command.

In addition, in the aforementioned preferred embodiment, while the contact command has been the editing data of the data form similar to that of character data which is similar to the line-feed data or the like, it may be stored in a storage area outside of the text area, as a dependent data which depends upon the front and rear characters.

Moreover, in the aforementioned preferred embodiment, while the present invention has been applied to the seal making device, the present invention may be applied to other character information processors such as a tape printing device, a word processor and a personal computer.

(B) Second Preferred Embodiment

Referring to the drawings, particularly to FIGS. 13 through 16, the second preferred embodiment of a character information processor according to the present invention, which is applied to a tape printing device, will be described below.

(B-1) Electrical General Construction of Second Preferred Embodiment

First, referring to the functional block diagram of FIG. 14, the electrical general constructions of a tape printing device in this preferred embodiment will be described.

Figure 14:
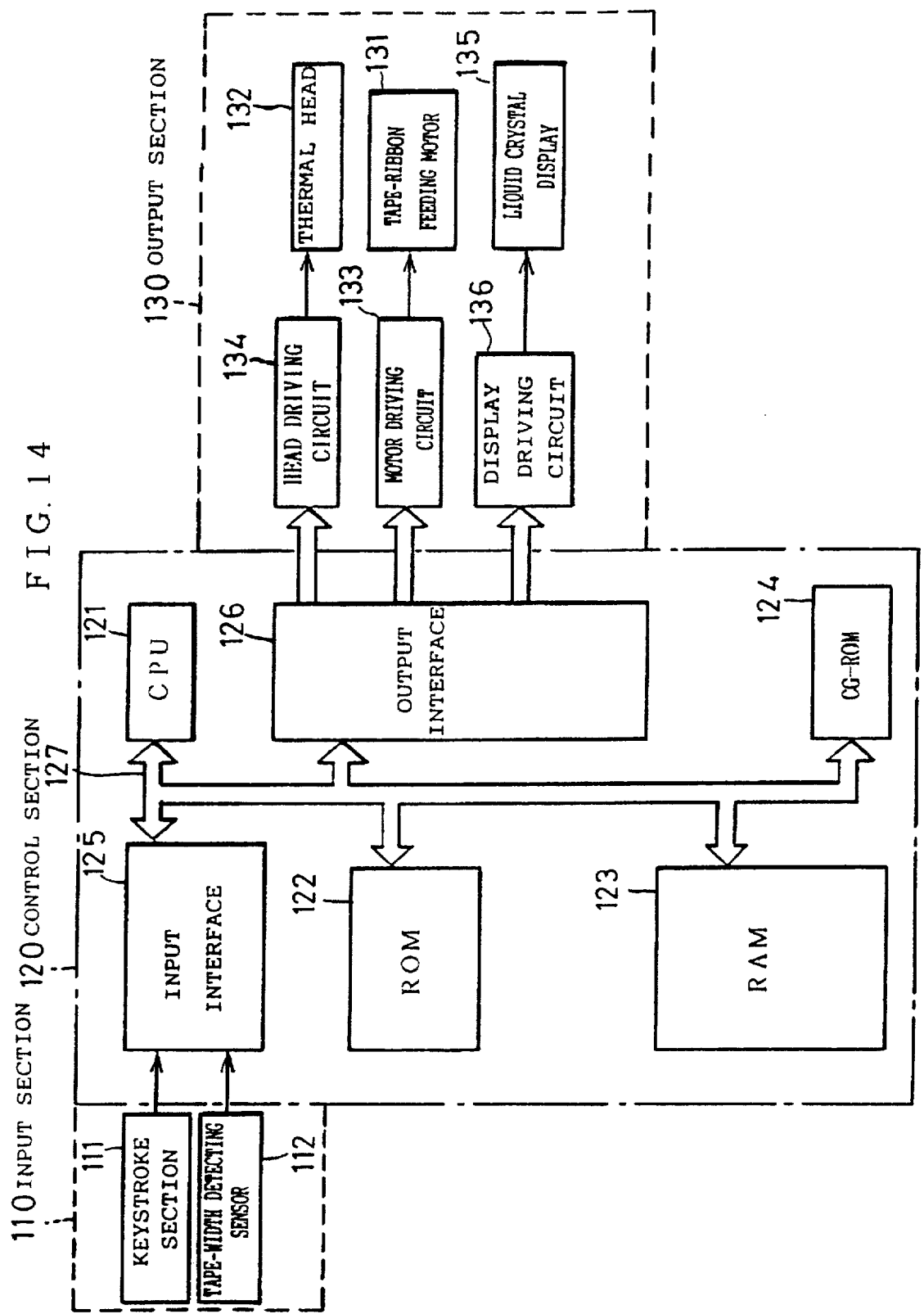
FIG. 14 is a functional block diagram illustrating the whole electrical construction in the second preferred embodiment.

As shown in FIG. 14, similar to other character information processor, the tape printing device in this preferred embodiment generally comprises an input section 110, a control section 120 and an output section 130. The control section 120 is designed to carry out the processing on the basis of the information from the input section 110, the processing stage at that point of time and so forth, and to cause the output section 130 to display or print the processed results.

The input section 110 comprises: a keystroke section 111 equipped with a depression key, a dial key and so forth, the details of the construction of which are not described herein; and a tape-width detecting sensor 112. The keystroke section 111 is designed to produce character code data, various control data and so forth, which are supplied to the control section 120. The tape-width detecting sensor 112 is designed to detect the width of a mounted tape to supply tape-width information to the control section 120. In practice, the tape is housed in a tape cartridge, and the tape cartridge is provided with a physically discriminated element such as a hole for defining the width of the tape. The tape-width detecting sensor 112 reads this physically discriminated element to output the tape-width information.

The output section 130 comprises a printing component and a display component. For example, a tape-ribbon feeding motor 131 comprising a stepping motor is designed to feed a tape or an inked ribbon (not shown) which is mounted on the device, to a predetermined printing position or outside of the device. A thermal head 132 is fixedly mounted to carry out the printing of the traveling tape by the thermal transfer. The tape-ribbon feeding motor 131 and the thermal head 132 are driven by means of a motor driving circuit 133 and a head driving circuit 134 while being controlled by the control section 120. The printed tape is cut by, for example, a cutter (not shown) which is manually operated by the user or which is driven by a motor (not shown).

In the case of the tape printing device in this preferred embodiment, a liquid crystal display 135 is provided as a display section. The liquid crystal display 135 is driven by means of a display driving circuit 136 while being controlled by the control section 120.

The control section 120 is, for example, a microcomputer, and comprises a CPU 121, a ROM 122, a RAM 123, a character generator ROM (CG-ROM) 124, an input interface 125 and an output interface 126 which are connected to each other via a system bus 127.

The ROM 122 stores therein various processing programs (see FIGS. 13 and 16), and fixed data such as dictionary data for kana-kanji conversion. The RAM 23 is used as a working memory, and stores therein fixed data relating to the user's input. Furthermore, the RAM 123 is backed up when the power supply is turned off. The processing programs and the fixed data, which are stored in the ROM 122, and the data stored in the RAM 123 will be described in the descriptions of various processing steps described later.

The CG-ROM 124 stores therein the dot patterns of characters and symbols which are prepared in the tape printing device, and outputs a corresponding dot pattern when a code data for defining a character or symbol is supplied. Furthermore, separate CG-ROMs for display and printing may be provided. The dot patterns of characters and symbols stored in the CG-ROM 124 include various sizes of dot patterns as described later.

The input interface 125 provides the interface between the input section 110 and the control section 120, and the output interface 126 provides the interface between the output section 130 and the control section 120.

The CPU 121 executes the processing program in the ROM 122, which program is determined by the input signal from the input section 110 and by the processing stage at that point of time, while utilizing the RAM 123 as a working area, and properly using the fixed data stored in the ROM 122 and the RAM 123 if necessary. The CPU 121 causes the liquid crystal display 135 to display the processed state, the processed results and so forth, and controls the printing on a tape (not shown).

(B-2) Structure of Attribute Data of Print Effects

The tape printing device in this preferred embodiment is particularly characterized by the processing for changing the attitude data of printing effects.

Before describing such change processing, referring to FIG. 15, the structure of attribute data of printing effects and so forth, which are stored in the RAM 123 (which may be the ROM 122 in the case of default data) will be described.

As shown in FIG. 15 in the horizontal direction, the attribute data of printing effects and so forth are classified into attribute data belonging to "background", "format", "style" and "mode", on the basis of their available extents. As mentioned above, each of the attributes of printing effects belonging to "format", "style" and "mode", is a minimum unit which can form a document (the whole character strings to be printed at a time), a paragraph and a character. The attribute belonging to "background" relates to the state of the device, and for example, it corresponds to the printing density and the display density.

In addition, as shown in FIG. 15 in the vertical direction, the attribute data of printing effects and so forth are also classified into "default data", "save data", "provisional (temporary) data" and "individual data" from another standpoint. In FIG. 15, the sign "O" indicates that each of the default, save, provisional (temporary) and individual data, which are arranged in the vertical direction, exists with respect to a corresponding one of "background", "format", "style" and "mode" which are arranged in the horizontal direction, and the sign "X" indicates that each of the default, save, provisional (temporary) or individual data, which are arranged in the vertical direction, does not exist with respect to a corresponding one of "background", "format", "style" and "mode" which are arranged in the horizontal direction.

The save background data is a background data which can be set and changed by a series of processing steps starting from the operation of a predetermined key (e.g. an environment key), and always effectively functions. The default background data is a background data which is set by the maker and which can not be changed by the user, and is substituted for the save background data when no background data exists. The temporary background data is a background data which is designated by a designation key for a special printing and which is effective only for one printing at that time, and it is, for example, a designated data for the enlarging printing, the mirror-character printing or the like.

The save format data is used to produce an individual format data when an individual document is produced (which will be hereinafter referred to as a "doucments format data"), and is a format data which can be set and changed by a series of processing steps starting from the operation of a predetermined key (e.g. the environment key). Although the save format data does not directly correspond to the individual documents, it is a common format data which is suitable for corresponding to many documents. The default format data is a format data which is set by the maker and which can not be changed by the user, and is substituted for the save format data when no save format data exists. The document format data is a format data which is set for individual documents and which can be stored so as to correspond to the document data. The user can change this document format data by the change processing steps starting from the depression of the format key.

The save style data is used to produce a provisional style data when the individual document is produced, and is a style data which can be set and changed by a series of processing steps starting from the operation of a predetermined key (e.g. the environment key). Although this save style data does not directly correspond to the individual documents and paragraphs, it is a common style data which is suitable for corresponding to many documents and paragraphs. The default style data is a style data which is set by the maker and which can not be changed by the user, and is substituted for the save style data when no save style data exists.

The provisional style data causes to produce the save style data as a copy master when the individual document is produced. This provisional style data is used to produce an individual style data (which will be hereinafter referred to as a "paragraph style data") when a paragraph is produced (including when a document is produced), and it can be stored so as to correspond to the individual document data. The paragraph style data is a style data which is individually set for the respective paragraphs and which can be stored so as to correspond to the character string data in the individual paragraphs. The user can change the provisional style data and the paragraph style data by the change processing steps starting from the depression of the style key.

This preferred embodiment is characterized that the provisional style data is provided in addition to the paragraph style data. The reason why the provisional style data is provided will be described in the descriptions of the change processing steps starting from the depression of the style key, which will be described later.

The save mode data is used to produce a provisional mode data when the individual documents are produced, and is a mode data which can be set and changed by a series of processing steps starting from the operation of a predetermined key (e.g. the environment key). Although this save mode data does not directly correspond to the individual documents, paragraphs and characters, it is a common mode data which is suitable for corresponding to many documents, paragraphs and characters. The default mode data is a mode data which is set by the maker and which can not be changed by the user, and is substituted for the save mode data when no save mode data exists.

The provisional mode data causes to produce the save mode data as a copy master when the individual sentences are produced. This provisional style data is used to produce a line-head mode data, which is a kind of individual mode data, when a paragraph or line is produced (including when a sentence is produced). The line-head mode data is a mode data which corresponds to all the characters arranged on the corresponding line, and it can be stored so as to correspond to a line-head mark data indicative of the head of the line. A character mode data, which is another kind of the individual mode data, is a mode data which is effective from a character, for which the character mode data is set, to the last character on the same line. The user can change the provisional mode data and the character mode data (including the line-head mode data in some structures of device) by the change processing steps starting from the depression of the mode key.

This preferred embodiment is characterized that the provisional mode data is provided in addition to the line-head mode data and the character mode data. The reason why the provisional mode data is provided will be described in the descriptions of the change processing steps starting from the depression of the mode key, which will be described later.

Among the aforementioned attribute data of printing effects having a hierarchical structure, the document format data, the provisional style data, the paragraph style data, the provisional mode data, the line-head mode data and the character mode data are treated as a part of document data, and can be stored and read together with the document data.

(B-3) Change Processing of Style Data

Referring to the flowchart of FIG. 13, as one feature of this preferred embodiment, a series of processing steps, which are executed when a style key (which may be either of an exclusive key or a generic key) is operated, i.e. the change processing steps of style data, will be described in detail (the processing program is stored in the ROM 122).

Figure 13:
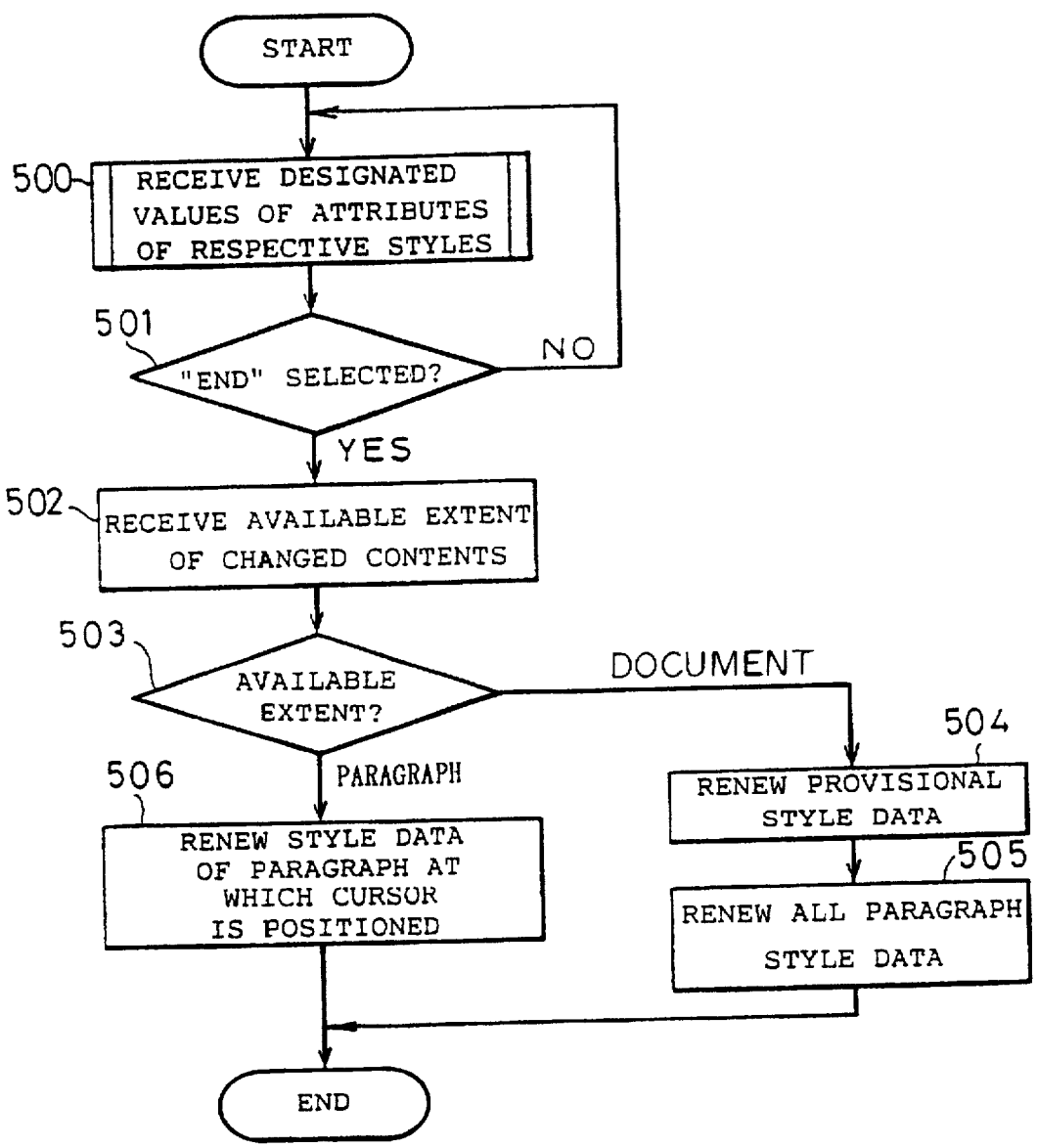
FIG. 13 is a flowchart of the change processing of a style data in the second preferred embodiment according to the present invention.

When the CPU 121 recognizes the operation of the style key in the keystroke section 111, it starts to execute the change processing of the style data shown in FIG. 13.

Then, the CPU 121 receives designation values of the respective attributes belonging to the style (which will be hereinafter referred to as a "style attribute"). The designation values of the respective style attributes are received by, for example, the following method.

Furthermore, in the case of this preferred embodiment, as the style attributes, there are prepared the combination of character sizes on the respective lines in a paragraph (which will be hereinafter shortened as a "character size"), the method for adjusting character strings in a paragraph (which will be hereinafter shortened as a "layout"), and the presence or absence of frame and table (which will be hereinafter shortened as an "frame/table"). As choices on a first hierarchy, there is prepared an "end" indicative of the end of designation, in addition to the "character size", "layout" and "frame/table". In this order or in the reverse order, the choices on the first hierarchy can be switched.

First, a paragraph data of a paragraph, at which the cursor is positioned when the style key is operated, is copied in a working buffer for setting style, which is provided in the RAM 123.

Then, it is displayed that the "character size" is one of choices (e.g. the half-tone dot meshing display), and the present designation value is displayed. In this state, a key to be operated is discriminated. If a key for switching to the last proposed choices is operated, it is displayed that the "end" is one of choices (e.g. the half-tone dot meshing display). If a key for switching to the next proposed choices is operated, it is displayed that the "layout " is one of choices (e.g. the half-tone dot meshing display), and the present designation value is displayed. The user can switch the choices on the first hierarchy by operating such a proposed-choices switching key.

In a case where the "character size", "layout" or "frame/table" is displayed as choices of the first hierarchy, when a key for directing to select is operated, the present designation value is displayed by a special display (e.g. the half-tone dot meshing display), and the processing steps for receiving specified designation values are carried out. The specified values are received by switching choices by means of the switching key for choices and by operating a key for directing to select. Furthermore, in the case of some style attributes, the hierarchies for choices may include a third hierarchy in addition to the second hierarchy. The third hierarchy is processed in the same manner.

In a case where a specified value with respect to the choices (style attribute: "character size", "layout" or "frame/table") on the first hierarchy is received (in a case where the select is decided at the lowermost hierarchy), the specified value of the working buffer for setting style is renewed, and then, the choices on the next first hierarchy is displayed.

Thus, it is possible to receive designation values of the respective style attributes. As mentioned above, in such receiving processing, the "end" may be displayed as the choices on the first hierarchy. In this state, it is discriminated whether the key for directing to select has been operated. Step 501 in FIG. 13 indicates this discrimination step.

In a case where the "end" is displayed, when the key for directing to select is operated, the CPU 121 asks the user to indicate an extent in which the present designated style data effectively functions, receives the available extent and discriminates the received available extent (steps 502, 503).

With respect to style, it is allowed to designate a document or a paragraph as the available extent, and it is received whether any one of them is designated. As the receiving method, the following method can be applied.

For example, the following message of two lines
"Effective Range?
This Document This Paragraph "
is displayed on the liquid crystal display 135, and one of character strings "This-Document" and "This Paragraph" is displayed by the half-tone dot meshing so as to clarify that it is a proposed choice. The character string displayed by the half-tone dot meshing is changed by operating the key for switching the proposed choice. Then, by operating the key for directing to select, the extent corresponding to the character string displayed by the half-tone dot meshing is received as an available extent.

In addition, for example, the message of one line "Effective Range? This Document" is displayed on the liquid crystal display 135, and the displayed portion "This Document" is changed to "This Paragraph" by operating the key for switching the proposed choice. Moreover, if the key for switching the proposed choice is operated, the displayed portion "This Paragraph" is changed to "This Document". Thus, in a case where one of "This Document" and "This Paragraph" is displayed, if the key for directing to select is operated, the extent corresponding to the displayed portion "This Document" or "This Paragraph" is received as an available extent.

When the newly changed input available extent of the style data is a document, the provisional style data of this document is renewed to a style data stored in the working buffer for setting style (step 504 , and the existing paragraph style data of this document is renewed to the renewed provisional style data to complete a series of change processing steps (step 505) and to return to the display for receiving input character strings.

On the other hand, when the changed input available extent of the style data is a paragraph, the paragraph style data of the paragraph, at which the cursor is positioned when the style key is operated, is renewed to a style data stored in the working buffer for setting style, and a series of change processing steps are completed to return to the display for receiving input character strings.

Furthermore, for example, in a case where the designated available extent is a document, though the character size of the present inputted style data corresponds to a paragraph of three lines, when paragraphs other than the three lines are contained in the document, the contradiction is eliminated by, for example, storing the character size data of default with respect to the paragraphs other than the three lines in the aforementioned step 506.

As mentioned above, by providing the provisional style data as a data hierarchy, it is possible to reflect the changed style data on all the paragraphs of the present document (including paragraphs produced after this operation).

Furthermore, when the available extent is a document, the save style data could be renewed without providing the provisional style data. However, in this case, the change style data has an influence upon the paragraphs of the documents other than the document relating to the present input, so that it is not preferred. That is, the setting and change of the save style data is allowed only when the user strongly intends to carry out the setting and change, so that the change of the save style data is provided as separate processing.

(B-4) Change Processing of Mode Data

Referring to the flowchart of FIG. 16, as another feature of this preferred embodiment, a series of processing steps, which are executed when a mode key (which may be either of an exclusive key or a generic key) is operated, i.e. the change processing steps of mode data, will be described in detail (the processing program is stored in the ROM 122).

When the CPU 121 recognizes the operation of the mode key in the keystroke section 111, it starts to execute the change processing of the mode data shown in FIG. 16.

Then, the CPU 121 receives designation values of the respective attributes belonging to the mode (which will be hereinafter referred to as a "mode attribute"). Since the designation values of the respective mode attributes are received by the substantially same method as that for receiving the designated values of the respective style attributes, the detail descriptions thereof are omitted herein.

Furthermore, in the case of this preferred embodiment, as the mode attributes, there are prepared the printing for vertical or horizontal writing, the printing font, the modification for character, the extension or compression of character, the application of the surrounding ruled line or the half-tone dot meshing to characters, the character pitch up to the next character and so forth.

Furthermore, the mode data (the line-head data or the character mode data) relating to the character, at which the cursor is positioned when the mode key is operated, is copied in the working buffer for setting mode, which is provided in the RAM 123.

Similar to the change processing of the style data, during the operation for receiving the designated values of the respective mode attributes, the "end" may be displayed as one of choices on the first hierarchy for allowing the select of the type of mode attribute. In this state, it is discriminated whether the key for directing to select has been operated (step 601).

In a case where the "end" is displayed, when the key for directing to select is operated, the CPU 21 asks the user to indicate an extent in which the present designated mode data effectively functions, receives the available extent and discriminates the received available extent (steps 602, 603). Since the specific method for receiving the available extent is the same as that for the style data, the descriptions thereof are omitted.

When the newly changed input available extent of the mode data is a document (e.g. "This Document" as a display for choices), the provisional mode data of this sentence is renewed to a mode data stored in the working buffer for setting mode (step 604), and the existing paragraph mode data for all the lines of this document are renewed to the renewed provisional mode data to complete a series of change processing steps (step 605) and to return to the display for receiving input character strings.

In the case of a device in which the renewal of the line-head mode data is allowed, the renewal of the mode data for every lines at step 605 is carried out by renewing the line-head mode data, and in the case of a device in which the renewal of the line-head mode data is not allowed, it is carried out by adding a character mode data as the next data to the line-head mark data on which the line-head mode data is set. Furthermore, the change of the mode data for every lines at steps 606 and 607, which will be described later, is carried out in the same manner.

In a display for receiving input character strings, there is displayed symbol characters which indicate that a line-head mark, an input character and a character mode data are set. The symbol character, which indicates that a character mode data is set, is displayed before a character having a character mode data which effectively functions. The setting of the character mode data can be canceled by moving the cursor to the symbol character, which indicates that the character mode data is set, to directing to delete. In addition, in a case where two character mode data adjoin by adding a character mode data, the old character mode data is designed to be renewed to the new character mode data.

As mentioned above, in a case where the provisional mode data is renewed, the present mode data is also applied to a line produced after the change processing of the mode data is completed, so that it is significant that the provisional mode data is provided as a data hierarchy.

When the available extent of the newly inputted changed mode data is a paragraph (e.g. "This Paragraph" as a display for choices), the CPU 121 renews the mode data of all the existing lines belonging to the paragraph, at which the cursor is positioned when the mode key is operated, to a mode data stored in the working buffer for setting mode, to complete the series of change processing steps (step 606) and to return to the display for receiving input character strings.

With respect to lines in the same paragraph produced after returning to the display for receiving input character strings, a mode data which is set as a provisional mode data at that point of time and which is different from the newly changed mode data, is set as a mode data of the line. Furthermore, with respect to other lines in the same paragraph produced after returning to the display for receiving input character strings, in order to effectively set the newly changed mode data, for example, a second provisional mode data renewed to the newly change mode data may be provided to copy the second provisional mode data as a newly produced line-head mode data until switchover to new paragraph is directed.

After the discrimination at the aforementioned step 603, when it is recognized that the available extent of the newly inputted changed mode data is a line (e.g. "This Line" as a display for choices), the CPU 121 renews the mode data of the line, at which the cursor is positioned when the mode key is operated, to a mode data stored in the working buffer for setting mode, to complete the series of change processing steps (step 607) and to return to the display for receiving input character strings.

Moreover, when the available extent of the newly inputted changed mode data is a character (e.g. "From This Character" as a display for choices), the CPU 121 adds a character mode data obtained by copying a mode data stored in the working buffer for setting mode, to the character at which the cursor is positioned when the mode key is operated, and completes the series of change processing steps (step 606) to return to the display for receiving input character strings.

While the change processing of style data and the change processing of mode data, which are the features of this preferred embodiment, have been described, the style data and the mode data, which are utilized for printing a sentence, are individual data such as a paragraph style data, a line-head mode data and a character mode data, not a provisional style data and a provisional mode data. Since this point is the same as those in conventional devices, the printing processing itself is the same as those of conventional devices.

(B-5) Advantageous Effects of Second Preferred Embodiment

As mentioned above, according to this preferred embodiment, the user can select an available extent of the changed style data and the changed mode data from a plurality of hierarchical extents which are greater than the minimum extent in which the style data and the mode data are effective, and the data in the selected available extent is changed to the changed data. Therefore, it is possible to particularly simplify the user's operativity when the attribute of printing effects is made to function in a broader extent than the minimum extent in which the attribute of printing effects can function, in comparison with conventional devices.

In addition, according to the aforementioned preferred embodiment, the operativity when changing the attribute of printing effects is improved as mentioned above. Therefore, many attributes of printing effects can be prepared as the attributes of mode data, in which the minimum extent being capable of functioning is narrowest. As a result, it is possible to increase the number of the attributes of printing effects which can be set and changed for every characters, so that the user can make various labels.

For example, in conventional devices, the available minimum extent is a paragraph with respect to the attribute of printing effect which defines the vertical or horizontal writing. According to this preferred embodiment, the available minimum extent is a character. Therefore, it is possible to make a label which includes vertical writing characters and horizontal writing characters in the same paragraph. In addition, in a case where the whole sentence or the whole paragraph is changed to any one of the vertical writing and the horizontal writing, the setting can be carried out by a simple operation which only selects "This Document" or "This Paragraph" after the change of the mode data is completed.

(B-6) Modifications of Second Preferred Embodiment

In the aforementioned preferred embodiment, while the available extents of the changed style data and the changed mode data have been selected by the user at the end of the change processing, the available extents may be selected by the user at the first of the change processing.

In addition, in the aforementioned preferred embodiment, while the same available extent has been set with respect to all the attributes of printing effects contained in the mode data, the available extents may be set for each of the attributes of printing effects contained in the mode data. Similarly, with respect to the style data, the available extents may be set for each of the attributes of printing effects.

The respective attributes of printing effects can optionally belong to any one of format data, style data and mode data, and the present invention should be limited to the aforementioned preferred embodiment.

In addition, in the aforementioned preferred embodiment, while the present invention has been applied to a tape printing device, it may be applied to other character information processors such as a seal making device and a word processor. In the claims, the term "printing" does not only include the printing using an ink, but also includes the transfer using light and so forth.

As mentioned above, according to the present invention, a character information processor for carrying out the processing for printing an input character string, comprises: (a) contact-command receiving means for receiving a contact command which commands to print at a character pitch of 0 between the adjacent two characters; and (b) printing control means for causing to print two characters, which are defined by the contact command, at a character pitch of 0, so that it is possible to simply direct to connect two characters with each other to print the two characters.

In addition, as mentioned above, according to the present invention, a character information processor comprises: (a) attribute-data changed contents receiving means for receiving inputted changed contents with respect to the attribute data of printing effect; (b) changed-contents available-extent receiving means for receiving an available extent of the changed contents which have been received or which are received, by allowing an user to select the available extent from a plurality of phased extents with respect to an input character string; and (c) attribute-data changing means for allowing to change the attribute data of printing effect in the whole extent or a partial extent with respect to the input character string received by the changed-contents available-extent receiving means, in accordance with the changed contents received by the attribute-data change-contents receiving means, so that it is possible to provide a character information processor in which the attribute data providing various printing effects on a printed matter can be changed by a simple operation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A character information processor for processing an input character string for printing, said character information processor comprising:

contact-command receiving means for receiving a contact-command which commands printing at a character pitch of zero between first and second adjacent characters in the input character string, and for storing the received contract-command between the first and second adjacent characters in a storage area storing the input character string, said contact-command being a data of the same type as a character data; and printing control means for controlling printing of the stored input character string, said printing control means being responsive to the stored contact-command for controlling the printing of the first and second characters in the input character string with zero pitch between the first and second characters.

2. A character information processor according to claim 1, wherein said contact-command is stored as a symbol characters selected from symbol characters which can be displayed by the character information processor.

3. A character information processor for containing a stored input character string along with attribute-data of printing effects, and for printing the input character string exhibiting the printing effects on a printed medium in accordance with the attribute-data, said input character string having a plurality of hierarchical extents, the character information processor comprising:

attribute-data changed-contents receiving means for receiving input of changed-contents with respect to the stored attribute-data of printing effects in the character information processor;

changed-contents extent receiving means for allowing a user to select an extent from the plurality of hierarchical extents of the input character string in which the attribute-data is to be changed in accordance with the input changed-contents received by the attribute-data changed-contents receiving means; and attribute-data changing means for changing the stored attribute-data of printing effects in the selected extent of the stored input character string in accordance with the changed-contents received by the attribute-data changed-contents receiving means.

4. A character information processor according to claim 3 wherein the plurality of hierarchical extents of the stored input character string include document, paragraph and character in the named order of hierarchy; and wherein said attribute-data changing means (a) responds to selection of the document extent to change the attribute-data in an immediate document including all paragraphs and characters in the immediate document of the stored input character string, (b) responds to selection of the paragraph extent to change the attribute-data in only an immediate paragraph including all characters in the immediate paragraph of the stored input character string, and (c) responds to selection of the character extent to change the attribute-data of only an immediate character of the stored input character string.

* * * * *

UNITED STATES PATENT AND TRADEMARK OFFICE
CERTIFICATE OF CORRECTION

PATENT NO. : 5,791,791
DATED : August 11, 1998
INVENTOR(S) : WATANABE et al

It is certified that error appears in the above-indentified patent and that said Letters Patent is hereby corrected as shown below:

On the title page: Item[30]    Insert the following:

--<u>Foreign Application Priority Data</u>
    December 28, 1995    [JP]  Japan.......... 7-342595
    January 5, 1996      [JP]  Japan.......... 8-000322--.

Col. 11, line 29, "massage" should read --message--.

Col. 15, line 51, "documents" should read --document--.

Col. 18, line 40, "(step 504" should read --(step 504)--.

Signed and Sealed this

Seventeenth Day of August, 1999

*Attest:*

Q. TODD DICKINSON

*Attesting Officer*      *Acting Commissioner of Patents and Trademarks*